United States Patent [19]

Johanson

[11] 4,004,200
[45] Jan. 18, 1977

[54] CHIP CAPACITOR WITH SPRING-LIKE LEADS

[75] Inventor: John E. Johanson, Boonton, N.J.

[73] Assignee: Johanson Manufacturing Corporation, Boonton, N.J.

[22] Filed: July 21, 1975

[21] Appl. No.: 597,870

[52] U.S. Cl. .............................. 317/242; 317/261; 339/258 R; 339/258 P; 339/275 A; 339/275 B
[51] Int. Cl.² .......................................... H01G 1/14
[58] Field of Search ........................ 317/242, 261; 339/258 R, 258 P, 275 A, 275 B; 338/329, 332; 24/259 R, 259 PW, 259 C, 259 TF; 248/316 D

[56] References Cited

UNITED STATES PATENTS

| 1,833,392 | 11/1931 | Dublier | 317/261 |
| 1,963,061 | 6/1934 | Bicknell | 317/261 |
| 2,143,369 | 1/1939 | Dublier | 317/261 |
| 2,599,303 | 6/1952 | Ward | 24/259 C |
| 3,110,873 | 11/1963 | Mittermaier | 24/259 R |
| 3,544,925 | 12/1970 | Swart | 317/261 |

FOREIGN PATENTS OR APPLICATIONS

| 879,187 | 2/1943 | France | 339/258 P |
| 884,289 | 12/1961 | United Kingdom | 248/316 D |

Primary Examiner—E. A. Goldberg
Attorney, Agent, or Firm—James J. Cannon, Jr.; James J. Cannon

[57] ABSTRACT

A lead attachment for a ceramic chip capacitor characterized by a metallic strip lead having at one end two pre-formed L-shaped tabs, perpendicular relative to said metal lead strip, the distance between the arms of said tabs being less than the width of said chip, and said strip having a longitudinal slot running from said tabs partially down its length; each tab having an arm positioned inwardly relative to the longitudinal axis of said lead strip such that said tabs mechanically grip in a spring-like manner, facilitated by the slot, the end of a metalized, pretinned ceramic chip capacitor positioned between said tabs, and thereafter said lead tabs further secured by heating the assembly, thus forming a uniform electrical connection between said chip capacitor and said tab portion of said lead.

4 Claims, 5 Drawing Figures

U.S. Patent  Jan. 18, 1977  4,004,200
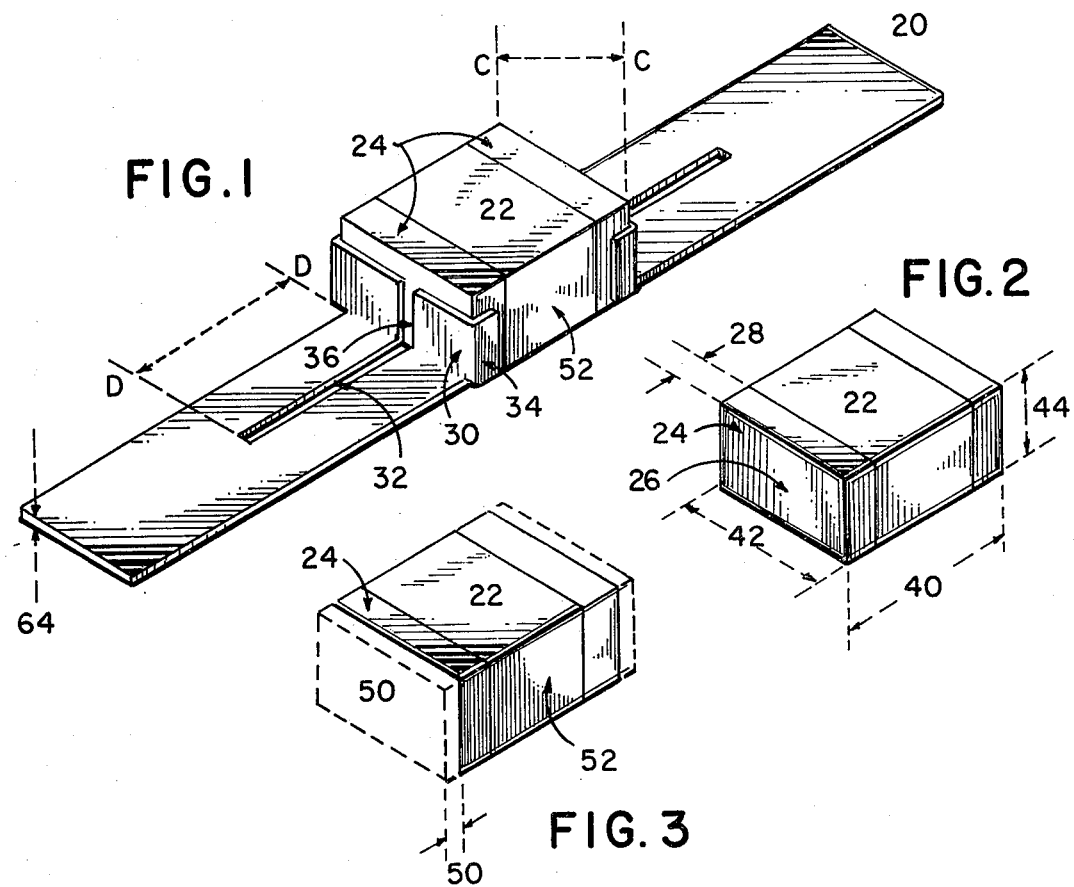
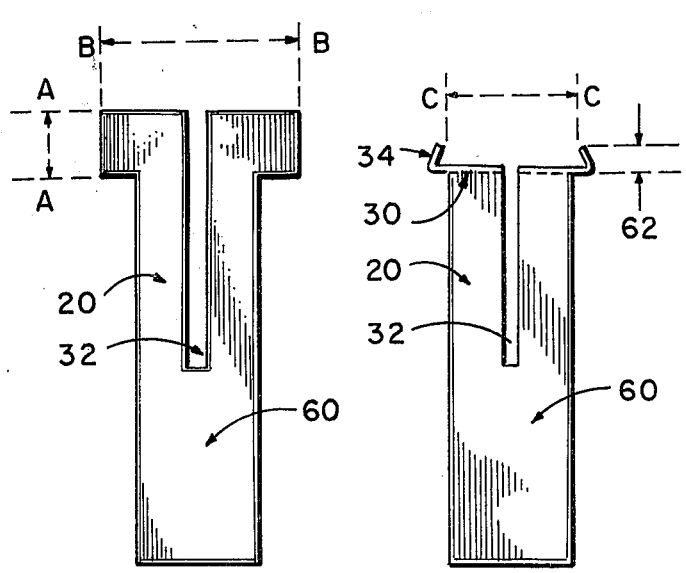

CHIP CAPACITOR WITH SPRING-LIKE LEADS

FIELD OF THE INVENTION

This invention relates to a lead attachment for a ceramic chip capacitor having L-shaped tabs which embrace and mechanically grip a pretinned, metalized ceramic chip capacitor in a spring-like manner and is further bonded and secured thereto by subjecting the assembly to heat thus providing a durable and uniform electrical connection.

DESCRIPTION OF THE PRIOR ART

Chip capacitors and their related lead attachments are well known in the prior art. The prior art has been concerned primarily with the development of high reliability capacitors and the procedures to form the capacitor. Lead attachment has been a secondary concern when considering performance. The present invention is concerned with the development of an integrated and a highly reliable lead attachment which will complement the advances in capacitor design yielding a totally reliable microcircuit combating such things as current leakage caused by a defective lead attachment which, in turn, is often caused by shock and vibration. The lead attachment of the present invention has been developed to provide greater resistance to physical shock or vibrations, thermal shock and chemical erosion which can cause the lead to become defective. This capacitor assembly, due to the above considerations, minimizes maintenance of the microcircuit.

The present invention is primarily concerned with a ceramic chip capacitor formed in the shape of a cube or other rectangular shape, the design of the capacitor being determined by the particular parameters required by the circuit in which the capacitor will be used. The chip capacitor is formed from a suitable dielectric material, such as a ceramic, which separates two conductors which are termed terminals or leads, between which a difference of electrical potential exists.

During the development of ceramic chip capacitors, it has been common to the art to metalize the portion of the chip to be attached to the lead, with the metal usually being palladium silver. The leads are then attached by soldering the same to the metalized portion of the ceramic chip capacitor. The solder, however, usually only secures the leads around the edges of attachment to the ceramic chip and may enclose air if the lead contact is not entirely flush to the metalized ends. U.S. Pat. No. 3,517,157 discloses a lead attach machine and the problems of the art which this process attempted to solve, i.e. misalignment of the leads to the chips. U.S. Pat. No. 3,480,421 also suggests the use of a similar method. This method appears to be standard to the art.

The present invention represents an improvement over the standard means of lead attachment which increases the durability and reliability of the lead assembly to which the prior art has not adequately addressed itself. The improved lead of the present invention has an L-shaped tab end with its extending arms being spread and then allowed to spring back to embrace the metalized sides of a chip capacitor to form an initial mechanical grip upon the capacitor. Prior to this operation the metalized portion of the capacitor has been pre-tinned and thus, when heated, the solder will spread evenly along all points of contact between the mechanically gripping L-shaped tab, which is flush with the ends and side metalized portions of the capacitor, thus effectively securing the same while assuring effective uniform contact with all electrodes of a monolithic ceramic chip capacitor which terminate on that end. The dual means of securing the lead to the chip capacitor creates a very reliable and durable attachment.

Thus the present invention discloses a lead attachment which will complement the high reliability characteristics of chip capacitors in that the lead mechanically grips the ceramic chip and is further secured by solder at all points of contact with the dielectric, providing a uniform connection for the microcircuit.

SUMMARY OF THE INVENTION

This invention relates to an improved lead attachment for high reliability ceramic chip capacitors. It is an object of the invention to form a uniform, secure and reliable electrical bond between the lead and the chip capacitor which will withstand the effects of physical and thermal shock including high frequency vibration. It is a further object to eliminate the possibility of water absorption at the point of the lead connection, to prevent chemical erosion of the connection, and to prevent circuit leakage at the connection; thus it is an object to provide a lead attachment which complements the high reliability and durability characteristics of the ceramic chip capacitor, yielding durability and long life with maximum usage of the microcircuit.

Three basic elements comprise a completed capacitor assembly. A ceramic chip capacitor has each of two ends and portions of the side edges adjacent thereto enclosed by a metalized band as is common to the art. In the present invention these bands are pre-tinned by dipping the capacitor in solder having a suitable melting temperature or by other appropriate means. Two identical metal leads are mounted, one to each of the pre-tinned metalized ends of the capacitor, wherein the leads mechanically grip the capacitor. The entire assembly is then passed through an oven so as to adhere the lead uniformly to the metalized end portions of the capacitor.

More particularly, each metallic lead consists of a strip of metal having two preformed L-shaped tabs at one end, which are defined by a slot which begins at the tab end and extends approximately one-half the length of the lead. Each tab is comprised of two distinct portions integrated with the body of the metal strip. Each L-shaped tab is positioned at a right angle extending upward with respect to the remainder of the lead strip. Its arm extends laterally at a right angle with respect to the tab. Thus the tabs extend across the end of the chip capacitor while the arms embrace and mechanically grip the side of the capacitor. The dimension or length between the inside edges of the tab arms is initially smaller than the width of each end of the metalized chip capacitor. The aforementioned slot allows the arms to be spread without deforming the lead; and thus a spring effect is achieved wherein the released tab arms spring back towards their original position, thereafter mechanically gripping the ends and side edges of the chip capacitor, positioned relative to the tabs, by reason of the opposing forces of the arms holding the capacitor between them. Therefore the force of the tabs is sufficient to hold the capacitor in place without damaging the same or without distorting the lead. The slot thereafter assures that no excess pressure will be applied to the capacitor.

The metalized portion of the capacitor is pre-tinned prior to the mechanical affixation of the lead, the attachment process is then completed by passing the capacitor and lead assembly upon a conveyor through an oven. The solder melts and flows evenly between the lead tabs and the metalized portions, yielding a uniform bond and seal between the same, and providing the final electrical connection of the microcircuit, and enhancing the mechanical attachment.

Thus the improved lead attachment enhances the high quality and reliability factors of the chip capacitor yielding long life and durability. The uniform soldering bond acting in combination with the mechanical gripping effect of the tabs is far superior in strength to prior art attachment methods. The bond is inherently impervious to moisture and other contamination.

Further features and advantages will become apparent from the following specification as related to the attached drawings.

BRIEF DESCRIPTION OF THE DRAWINGS

FIG. 1 is a perspective view of a ceramic chip capacitor attached to and secured by the lead attachment of the present invention.

FIG. 2 is a perspective view of the metalized chip capacitor of FIG. 1.

FIG. 3 is a perspective view illustrating the chip capacitor of FIG. 2 and its dimensional relationship when pre-tinned.

FIGS. 4a and 4b are top views of the lead attachment of FIG. 1 before and after the tab end has been formed respectively.

DESCRIPTION OF THE PREFERRED EMBODIMENT

Referring now to FIG. 1, wherein is illustrated a typical assembly of a ceramic chip capacitor and the novel lead attachment of the present invention, the reference numeral 20 designates the lead attachment generally and the reference numeral 22 designates a ceramic chip capacitor having metalized ends 24. Metalized ends 24 are typically a coating of palladium silver on ends 26 and a small portion of sidewalls 28, as illustrated in FIG. 2. In the typical assembly, two lead attachments 20 are utilized, one on each metalized end 24 of capacitor 22.

Lead attachment device 20, as illustrated in FIG. 1 comprises a strip of electrically conductive metal, such as silver, and has two preformed L-shaped tabs 30 integrally formed at the chip attaching end of lead attachment 20, separated by a longitudinal slot 32 in lead attachment 20.

Each tab 30 is an integral part of lead strip 20 and is positioned perpendicular relative to the horizontal plane formed by lead strip 20. Arms 34 of tab 30 are bent to form an angle slightly less than 90° relative to a vertical plane formed by tab 30. Arms 34 initially have a smaller width than that of end 26 of chip 22, thus effecting a mechanical grip upon chip 22. The solder bond completing the connection between tab 30 and metalized portion 24 is not graphically illustrated; however, the solder will encompass all of metalized portion 24 thus effecting a uniform bond and contact with tab 30. Solder will also fill vertical portion 36 of slot 32 which communicates with tab 30 and metalized portion 24.

FIG. 2 illustrates the typical embodiment of a ceramic chip capacitor 22 having metalized ends 24. It should be noted that the relative dimensions are only illustrative of the embodiment and are not meant to limit the invention. Chip 22 has the following dimensions: length 40 being 0.120 mm., width 42 being 0.100 mm., and a height 44 being 0.040mm. End 24 is completely metalized with the metal perimeter sidewall layer 28 extending a maximum, at each end, of 0.020 mm. of length 40 as is common to the art. The perimeter layer 28 and ends 24 are metalized as thinly as uniformly possible.

FIG. 3 illustrates the desired thickness of solder required to be adhered to metalized portion 24. The capacitor chip is pre-tinned so as to form a solder layer 50 up to a maximum of 0.005 mm. The pre-tinned capacitor chip, being generally designated as pellet 52, is then ready for attachment of leads 20.

Referring now to FIG. 4a, a top view of lead attachment device 20 prior to the formation of tabs 30 is illustrated. All portions of lead attachment 20 are shown lying in the same plane. Tabs 30 are 0.040 mm. wide along A—A, and are 0.120 mm. edge to edge along B—B. The major portion 60 of lead strip 20 is substantially rectangular and has dimensions 0.252 mm. by 0.090 mm. Slot 32, being 0.010 mm. wide, extends 0.165 mm. along lead strip 20 from tab end 30.

FIG. 4b illustrates a top view of lead attachment device 20 after formation of L-shaped tabs 30 which are designed so as to embrace and grip mechanically pellet 52 of FIG. 3 as illustrated in FIG. 1 in assembled form. Tab 30 has been bent perpendicular to a horizontal plane formed by rectangular section 60 of lead strip 20. Arms 34 have been bent to form an angle less thn 90°, relative to the remainder of tab 30, its ends being 0.085 mm. apart along C—C. Arms 34 have a length 62 of 0.015 mm.

Therefore, with respect to pellet 52 of FIG. 3, and the formed tab of FIG. 4b, it can be readily seen in FIG. 1 that tab 30 and arms 34 must be spread to a spacing at least 0.110 mm. along C—C. Slot 32 allows the spreading of tabs 30 without deforming the same and then causes arms 34 to spring back, embrace and mechanically grip metalized and pre-tinned pellet 52. FIG. 1 also illustrates the relative thickness 64 of lead 20, being 0.005 mm. After passing assembled lead attachment device 20 and chip capacitor 22 through an oven thus heating the solder, vertical portion 36 of slot 32 is filled with solder and that portion of slot 32 designated by D—D being 0.125 mm. in length remains unsoldered.

As previously stated, the applicant does not wish to be limited by the preceeding specifications and dimensions as there are many alternative variations possible without departing from the spirit of the invention.

I claim:

1. In a solid state electronic component, a ceramic chip capacitor and lead attachment assembly in combination comprising:
   a substantially rectangular capacitor having electrode ends;
   a metalized layer covering said electrode ends and a portion of the capacitor surfaces abutting and communicating with said electrode ends;
   a tinned layer covering said metalized layer upon said electrode ends;
   a conductive metallic lead strip being substantially rectangular, for each electrode end;
   said metallic lead strip terminating, to interface with said tinned and metalized capacitor, in a clasping tab portion, extending beyond the width of said lead strip, bent in a perpendicular relation to embrace three surfaces of said metalized and tinned capacitor, said tab portion, substantially encompassing said tinned electrode end, having cooperative, perpendicularly extending armatures abutting two of said metalized capacitor surfaces; and a mediately positioned longitudinal slot extending from said tab portion to approximately one-half the length of said conductive lead strip to effect and enhance the clasping action of said tabs.

2. The capacitor and lead assembly of claim 1 wherein said capacitor is of the monolithic type having a plurality of electrodes — dielectric layers.

3. A substantially rectangular chip capacitor with pre-tinned and metallized ends with a lead attachment comprising in combination:

a rectangularly shaped metal lead strip;

two cooperative substantially L-shaped tabs, bent in a perpendicular relation to said lead strip, terminating one end of said lead strip, each tab extending beyond the width of said lead strip such that the short arm portions of said tabs emanate away from said lead strip; and oppose and are inclined to each other;

a longitudinal slot separating said tabs and extending therefrom for approximately one-half of the length along the central axis of said lead strip;

said L-shaped tabs acting in combination with said slot to embrace and mechanically grip said metallized and tinned end of said chip capacitor, positioned relative to and flush with said tabs, in a springlike fashion.

4. The device of claim 3 wherein the lead attachment has a length between the outer extent of said opposing arms less than the length of the metallized and tinned end of said capacitor and the length between the inner portions of said arms is substantially the same as but not greater than the length of the metallized and tinned end of said capacitor.

* * * * *